Jan. 22, 1946.  B. A. ANDALIKIEWICZ  2,393,225
FLAW DETECTING METHOD
Filed Oct. 23, 1942  7 Sheets-Sheet 1

INVENTOR.
Boley A. Andalikiewicz
BY
ATTORNEY.

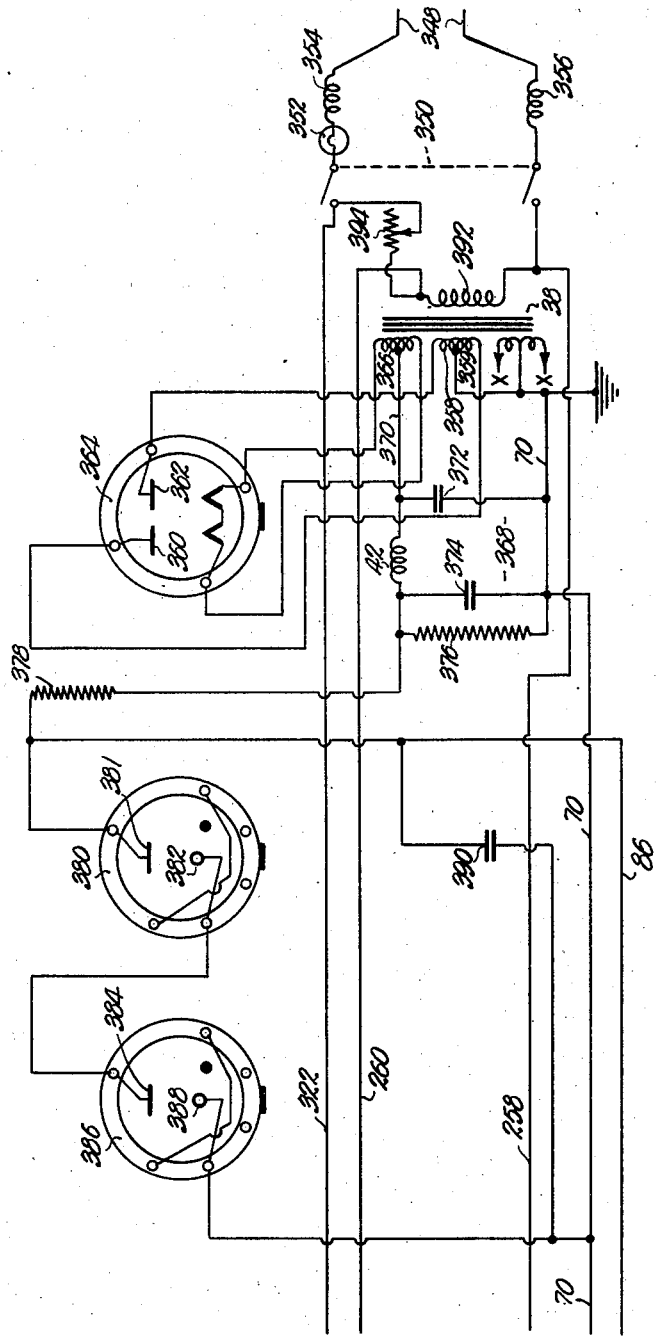

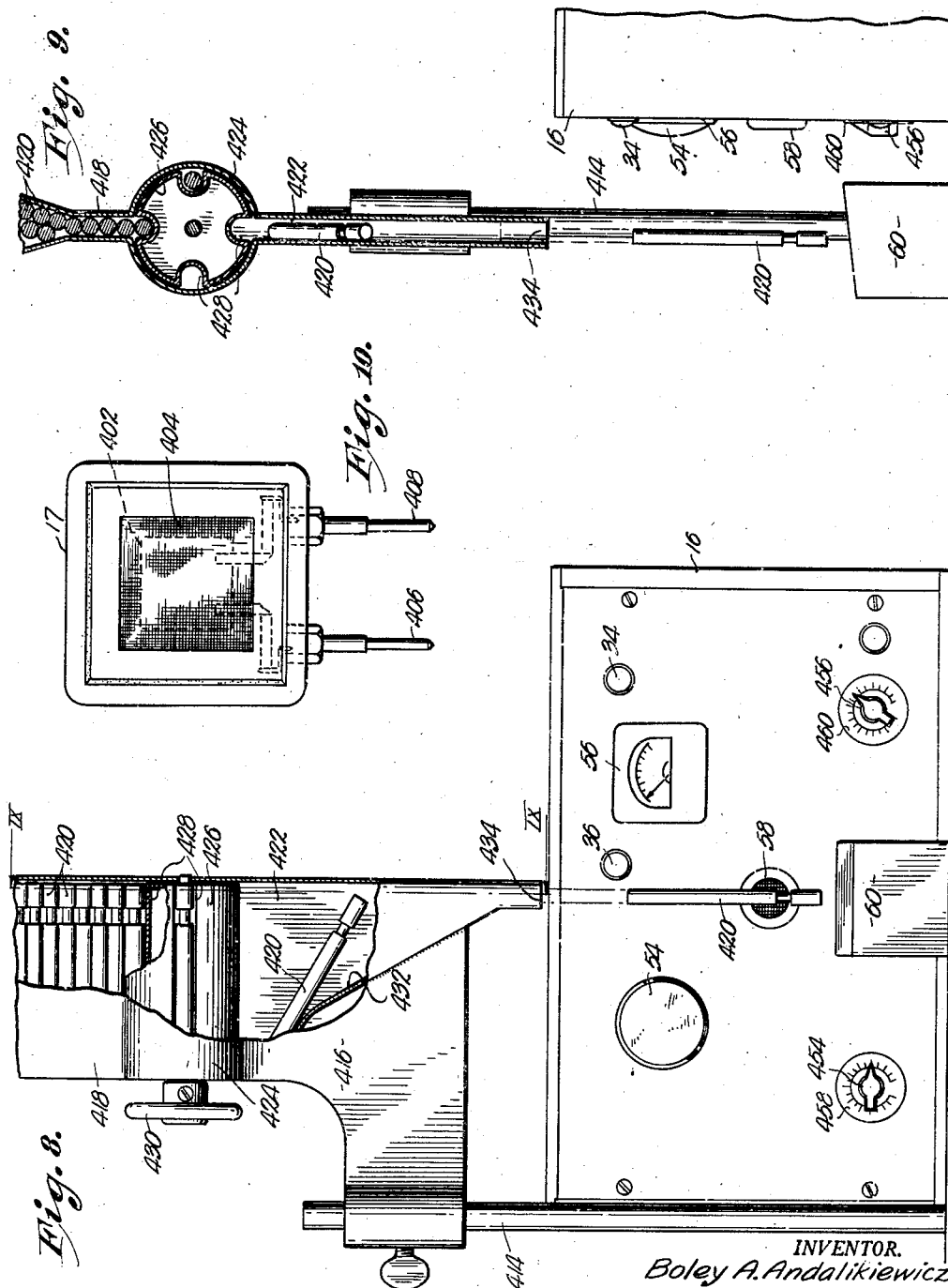

Patented Jan. 22, 1946

2,393,225

UNITED STATES PATENT OFFICE 2,393,225

FLAW DETECTING METHOD

Boley A. Andalikiewicz, Kansas City, Mo., assignor to C. E. Hovey, trustee, Kansas City, Mo.

Application October 23, 1942, Serial No. 463,103

5 Claims. (Cl. 73—69)

This invention has for its principal aim the provision of a method for selecting standard articles from a group of articles by means of discriminating between the sounds produced by the articles when they are vibrated.

It is known that defective metallic articles having flaws therein may be differentiated from flawless articles by the method of causing said articles to be set in vibration by striking with a hammer and then detecting the difference of the pitch of the sound given off by the respective articles. For example, a railroad wheel having a flaw therein will, when struck with a hammer, produce a different ring than one having no flaw. If the flaw is of sufficient magnitude, an appreciable difference in pitch will result and this will enable the listener to detect the wheel having a flaw therein. It is known that the frequency of the vibration of any given article is determined by the structural properties of that article. Thus, it is understood that articles having uniform structural properties will produce sounds of the same approximate frequency when the articles are set in vibratory motion.

It is the purpose of the instant invention to disclose a new and improved method utilizing the basic principle hereinbefore mentioned.

It has been discovered that very small cracks or physical differences in articles being tested produce a relatively small change in the vibratory characteristics of the respective articles, and therefore, improved methods and apparatus are required in order that these small differences may be detected. The instant invention makes use of the fact that an article which has been set in free vibration will give forth vibrations lying within a comparatively narrow range of frequencies, and further, that said free vibration will produce a greater amplitude of vibration.

One method of obtaining free vibration as disclosed herein, is to project the articles being tested upon an anvil where they are allowed to rebound therefrom and vibrate freely in the air. When this procedure is followed, it is observed that a greater degree of discrimination between articles of the same kind having slight differences can be obtained. Thus, a very minute crack in an object produces a measurable shift in the frequency of vibration of said object when the object is set in vibration by projecting the same against an anvil instead of striking it with a hammer. Where the article is struck by the hammer, it is necessary that means be employed to hold the article in a position where it may be struck and these means will restrain the vibration of the article and affect both the width of the band of the frequencies produced and the magnitude of the vibration. It has been observed that a much greater degree of discrimination between a standard and a non-standard article can be obtained due to the reasons as aforesaid when the articles are set in a free vibratory motion as herein disclosed.

Free vibration may be produced within an article by means other than projecting the same upon an anvil. In some cases projecting the article upon an anvil might result in damage to the article, and therefore, for this and other reasons, a method and apparatus for simulating free vibration in an article have been devised as are herein disclosed. Basically this method comprises placing an article having magnetic properties within an oscillating electro-magnetic field having a frequency of oscillation corresponding to the frequency of free vibration of the article being tested. The article is then supported by knife edges, or other means, at its nodal points and the excitation of the article by the magnetic field will result in a mode of vibration corresponding to the free vibration as aforesaid, and since the article is supported at its nodal points, the vibratory characteristics will not be influenced to an undesirable degree.

In the case of non-magnetic materials, these materials can be excited by an oscillating electrostatic field having the same frequency of oscillation as the articles being tested when the articles are supported as aforesaid.

This invention further contemplates distinguishing between the properties of similar articles by means of measuring the difference in amplitude of vibration as well as the frequency. For example, an object having material separation flaws therein, will not only produce a frequency different from that of the standard article, but will, as well, in most instances, produce a vibration of smaller magnitude. The degree of difference is determined by the relative size of the defect, however, this manifestation is readily measurable in nearly every instance and provides an accurate means of distinguishing between standard and non-standard articles.

It has also been discovered that the difference in amplitude between an article having a crack therein and one without the crack is so pronounced that even where the cracked article is projected with considerable force against an anvil, that the amplitude of the vibration produced thereby is not nearly as strong as the amplitude of vibration of a flawless article when the same is projected against an anvil with a much smaller degree of force than that employed to project the cracked article. The advantage of this discovery is utilized herein by means of an electronic apparatus which limits the amplitude of an impulse reaching a detector to a definite specified value. In the case of a standard article, this impulse will always be at a maximum and in the case of a non-standard or defective article, this impulse will be relatively smaller than the maximum impulse passed by the limiter to the detector. In this manner, apparatus for projecting the articles with equal force against an anvil is not required in the great majority of cases because of the relative difference in magnitude of vibration as aforesaid.

Another part of this invention contemplates the utilization of more than one natural frequency of vibration given off by certain types of articles. It has been discovered that many articles will, when set in vibration, give off a series of more than one vibratory frequency. This is particularly true of articles having irregular shapes and portions thereof, which differ in measurement from other parts of the article. Thus, an article when struck may produce a number of frequencies not harmonically related as well as a number of harmonics related to the different respective frequencies produced. The advantage of this principle is taken in testing articles by means of checking either separately or simultaneously, a series of more than one frequency. In many cases, articles having flaws will produce a frequency of vibration the same as that produced by a standard article but it has been discovered that other frequencies produced by the non-standard article will be at variance with that produced by the standard article.

The method herein disclosed lends itself equally well to detecting differences in similar non-metallic articles such as plastics, etc., as well as metallic articles having either magnetic or non-magnetic characteristics.

Further, this invention contemplates the application of its teachings to determining the existence of differences between similar articles, which is primarily occasioned by the fact that such articles are composites made of several pieces which are fastened together. The degree of fastening, or of relative fit, in the case of articles made up of several pieces may be easily determined by means of the method and apparatus herein disclosed.

It is a further aim of this invention to provide a method of discriminating between similar articles having relatively small dimensional differences. Thus, if the article being tested has dimensions appreciably different from those of a standard article, the same may be readily detected by examining the vibratory properties of the article being tested. This portion of the invention also contemplates the use of the device shown for sorting articles such as bolts, screws, rivets, bearings, etc.

In the drawings:

Figs. 3a, 3b, 3c, 4 and 5 illustrate a wiring diagram of applicant's entire electronic apparatus.

Fig. 8 is a front elevational view of the electronic apparatus, and a dropping means for projecting articles to be tested with equal force against the anvil. A portion of this dropping means is broken away to reveal the interior thereof.

Fig. 9 is a cross sectional view of the dropping means taken on line IX—IX of Fig. 8; and Fig. 10 is a front elevational view of the microphone with the dotted lines showing the disposition of the crystal microphone element therein.

Figure 1:
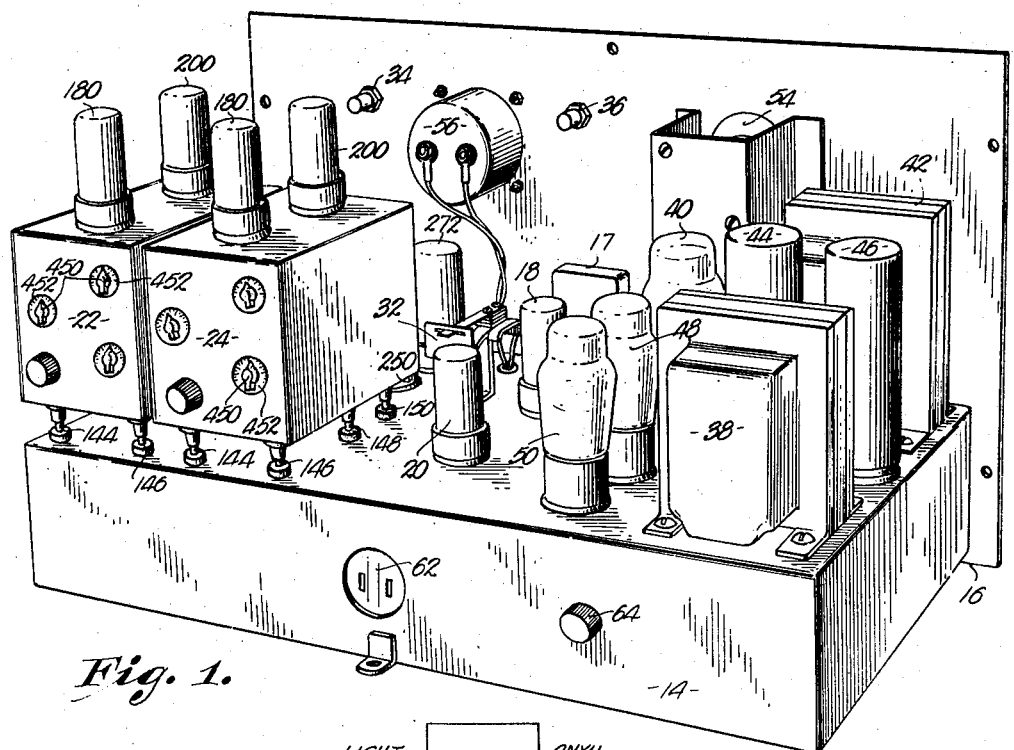
Fig. 1 is a perspective rear view of the electronic apparatus in which the teachings of this invention are employed.
Figure 2:
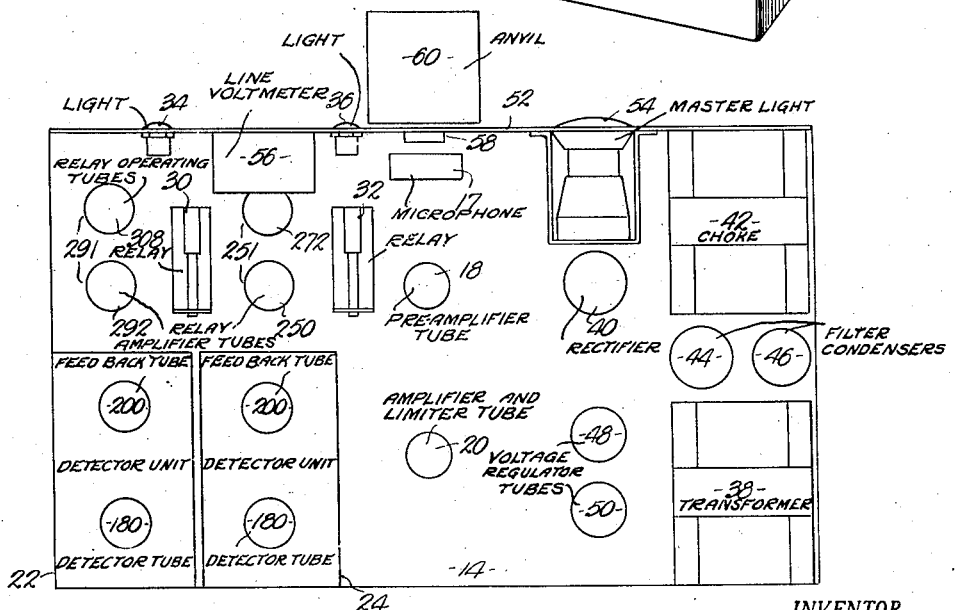
Fig. 2 is a diagrammatic horizontal plan view of the said electronic apparatus showing the positioning of the various components associated therewith, and an anvil in front of the apparatus upon which articles may be projected.

The commercial form of applicant's invention embodies the circuit 12 mounted on chassis 14 which is placed within a cabinet 16.

On the chassis is mounted microphone 17, pre-amplifier tube 18, amplifier and limiter tube 20, detector units 22 and 24, relay amplifier tubes 250 and 292, relay operating tubes 272 and 308, relays 30 and 32, and lights 34 and 36. Also mounted on the upper side of the chassis are transformer 38, rectifier 40, choke 42, filter condensers 44 and 46, and voltage regulator tubes 48 and 50.

A panel 52 is secured to chassis 14 and supports thereon lights 34 and 36, master light 54 and line voltmeter 56.

An opening 58 is placed near the center of the panel directly in front of microphone 17. An anvil 60 is placed in the vicinity of opening 58 whereby sounds may reach microphone 17.

At the rear of chassis 14 near the center thereof, is positioned a line receptacle 62. An external fuse mount 64 is to the right of the receptacle 62.

Figure 3A:
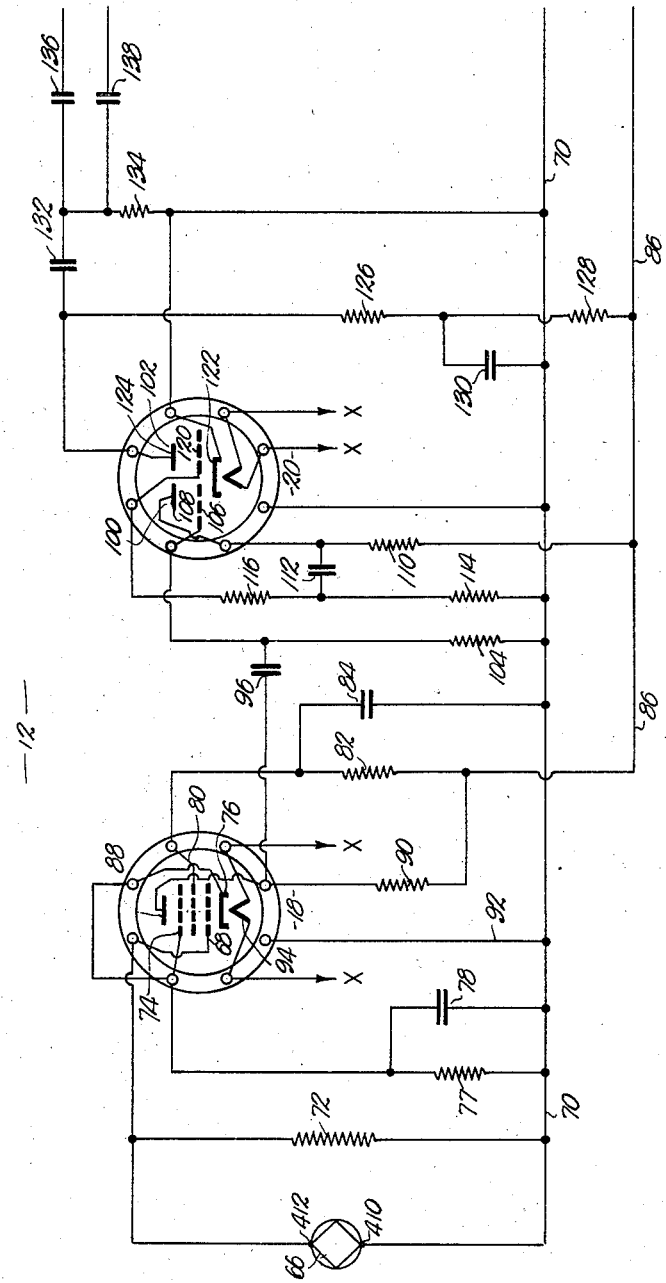

The circuit as shown in Fig. 3a incorporates a conventional pre-amplifier tube 18 and associated circuit components. A piezo-electric crystal unit 66 is arranged to feed an input voltage onto grid 68 of tube 18. A grid biasing resistor 72 is placed across the crystal to conduct current from the grid 68 to the negative return lead 70.

Tube 18 is preferably of the high-gain pentode variety having a suppressor and cathode 74 and 76 respectively, which are returned to negative lead 70 through cathode resistor 77 which is by-passed by condenser 78. Screen 80 has its voltage supplied through resistor 82 which is by-passed by condenser 84 to lead 70 and is connected to positive lead 86. Positive lead 86 has a normal potential of about 300 volts and plate 88 is connected to positive lead 86 through plate resistor 90. The shield lead 92 is connected to negative lead 70. Filament current is supplied filament 94 through wires XX which are attached to corresponding filament leads XX of transformer 38 as shown in Fig. 3c.

It should be understood that in each instance, the filament leads marked "XX" of the various vacuum tubes employed herein, are connected to the transformer as aforesaid.

The output of tube 18 is coupled by means of condenser 96 into the grid circuit of amplifier and limiter tube 20. Tube 20 is a dual type incorporating therein two triode sections 100 and 102 respectively. Section 100 serves to further amplify the output of crystal microphone 66. Condenser 96 is coupled across grid resistor 104 and into grid 106 of section 100. Plate 108 is connected to positive lead 86 through plate resistor 110. The output of section 100 is coupled through condenser 112 into the grid circuit of section 102. Condenser 112 has its output portion connected between resistors 114 and 116. Resistor 114 serves as a negative return path to lead 70 and resistor 116 is connected to grid 120 and serves to suppress spurious input voltages.

Cathode 122 of tube 20 and 98 is common to both sections 100 and 102 and is connected directly to negative lead 70. Plate 124 of section 102 is connected by means of plate resistor 126 and isolating resistor 128 to positive lead 86. A by-pass condenser 130 is connected between the two resistors and negative lead 70. The output of section 102 is coupled through output condenser 132 which in turn is coupled into an output resistor 134 and into detector input condensers 136 and 138.

Figure 3B:
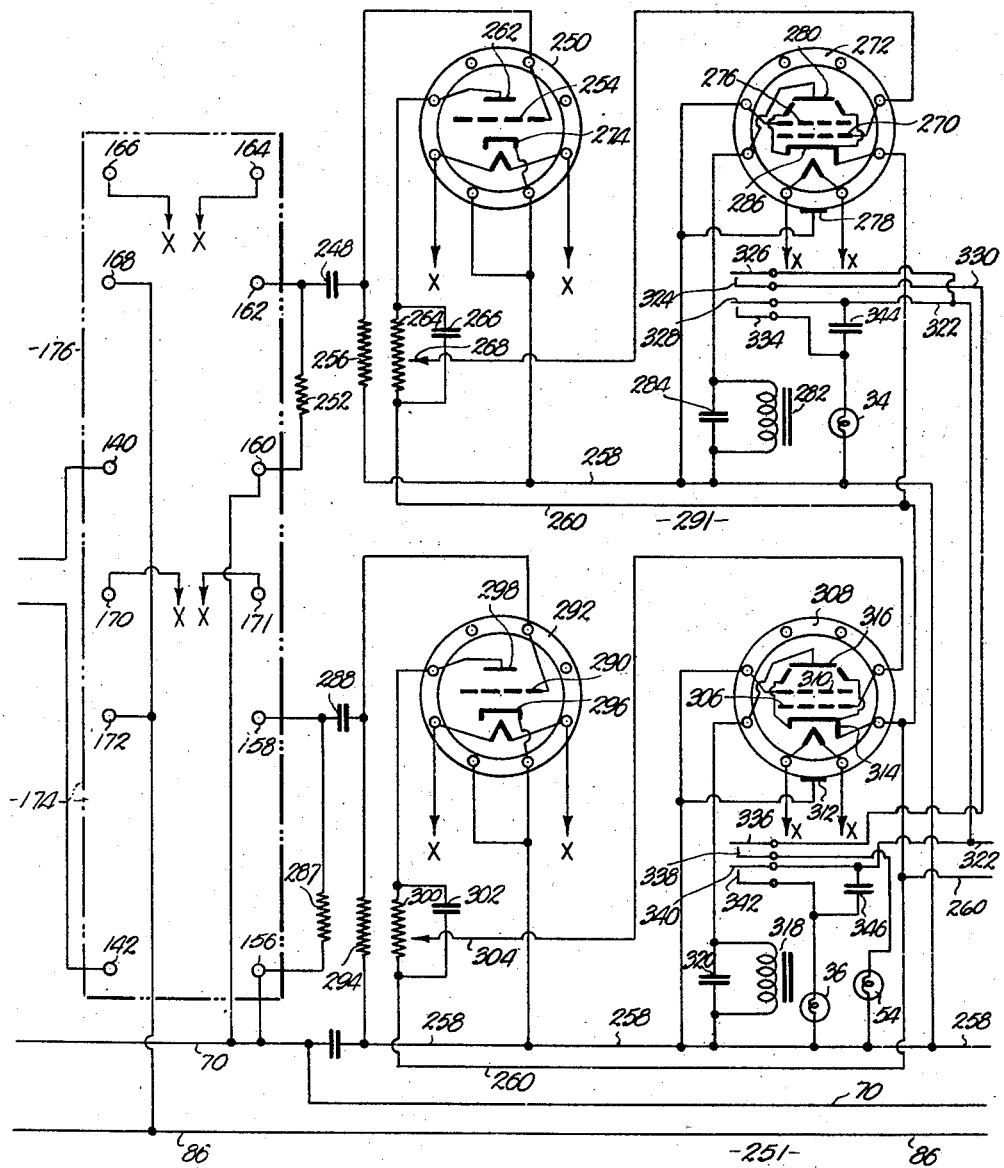

Condensers 136 and 138 are connected to jacks 140 and 142 respectively, as shown in Fig. 3b. These jacks 142 and 140 serve to connect the input plugs 144 of the detector units with the output of the limiter section 102. It is to be noted that detectors 22 and 24 are equipped with a total of six connecting plugs 144, 146, 148, 150, 152 and 154, on the bottom of each unit respectively (see Figs. 1 and 4). These detector units employ identical components and circuits—their difference being that each is tuned to a separate frequency. These units are constructed so that they may be plugged into jacks 156, 158, 171, 170, 172, 142, and 160, 162, 164, 166, 168 and 140. These jacks are mounted in a polarized arrangement on chassis 14. This arrangement permits easy and quick interchange of the units when it is desired to test objects having different frequencies.

Figure 4:
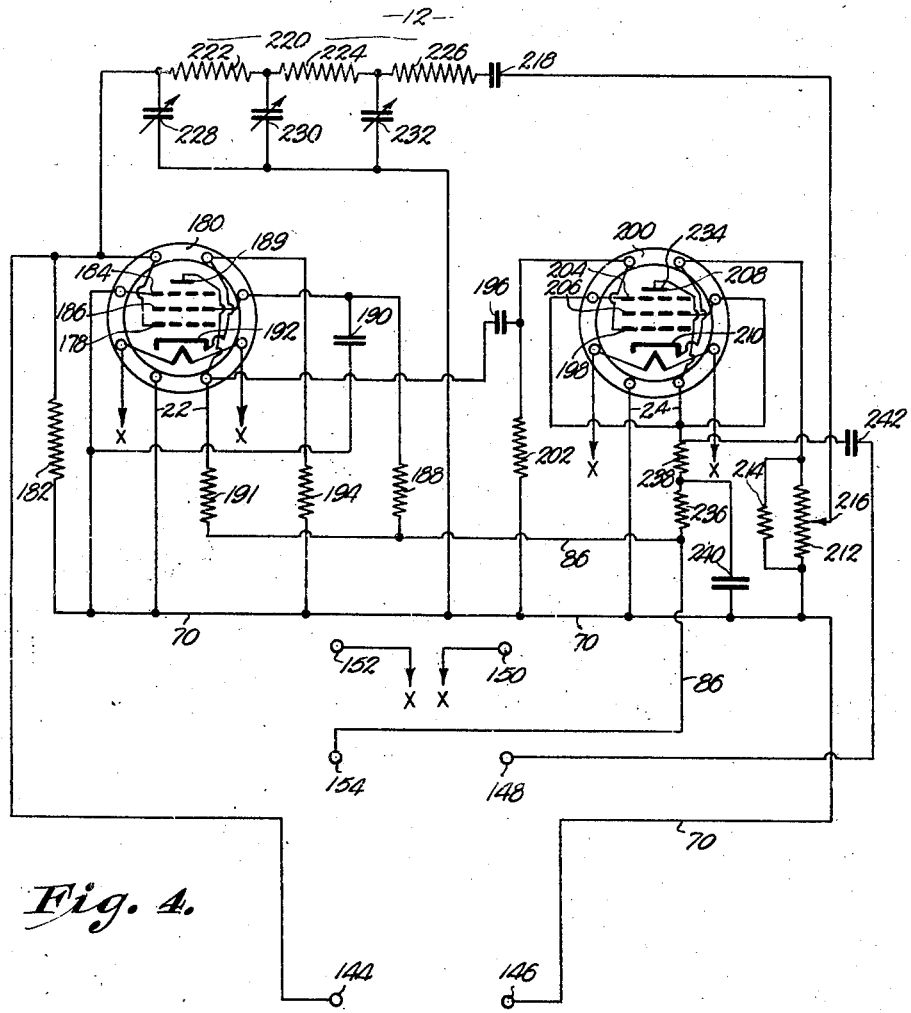

Fig. 4 illustrates the circuit common to each of the detectors 22 and 24. As aforesaid, connections of these units with the other parts of the circuit are made through the jacks and plugs which are grouped in two separate sets 174 and 176 respectively. The drawings clearly illustrate the relative positioning of the corresponding jacks employed in order to make connection between the detector units 22 and 24 and the other parts of the circuit. Input plug 144 is connected to grid 178 of detector tube 180. Grid 178 is returned to negative lead 70 through resistor 182. Suppressor 184 is connected to negative lead 70. Screen 186 is connected to positive lead 86 through resistor 188 and is by-passed to lead 70 through condenser 190. Cathode 192 is connected to negative lead 70 through biasing resistor 194. Plate 189 is connected to positive lead 86 through plate resistor 191. The output of the plate circuit is coupled by means of condenser 196 to grid 198 of feed back tube 200. A grid to ground return is provided by means of grid resistor 202 which is connected to negative lead 70. Suppressor 204 and screen 206 are connected to plate 208 whereby tube 200 will function as a triode.

Cathode 210 is connected to negative lead 70 through potentiometer 212. This potentiometer 212 is shunted by resistor 214 which serves to limit the current carried by potentiometer 212. Arm 216 of potentiometer 212 is connected by means of condenser 218 to phase shifting network 220. This network is a three mesh circuit which is comprised of resistors 222, 224, 226 and variable condensers 228, 230 and 232. These variable condensers have one of their terminals connected together and all are terminated in connection with negative lead 70. Resistors 222, 224 and 226 are connected in series between condenser 218 and the grid of tube 180. The remaining terminals of condensers 228, 230 and 232 are connected to the grid of tube 180 between resistors 222 and 224 and between resistors 224 and 226 respectively. Thus, the output of the network 230 is coupled into the grid circuit of tube 180.

Negative return lead 70 and positive return lead 86 are connected to pins 146 and 154 respectively. The filament leads marked XX are connected through pins 150 and 152 to filament taps XX of transformer 38. The plate circuit of tube 200 is comprised of plate 234, which is connected to positive lead 86 through isolating resistance 236 and plate resistance 238. Isolating resistance 236 further serves to limit the energy output of tube 200 and is by-passed by condenser 240 which is connected to negative lead 70. Plate 234 is connected to output condenser 242. Condenser 242 is connected to plug 148 which serves to connect the output of the detector unit with the input of the relay amplifier tube 26.

From a consideration of this circuit, it is apparent that an input into tube 180 will result in an input into the grid circuit of tube 200. This input will be reflected in the current through potentiometer 212. By adjusting potentiometer 212, a voltage may be obtained therefrom which, when coupled back through the phase shifting network 220, will produce oscillation in the circuit.

It is to be noted that potentiometer 212 may be adjusted to such degree that the circuit may be spoken of as being on the verge of oscillation. At this point of operation, if a current having a frequency that will result in its being shifted 180° by network 220 is passed through said network, the circuit will oscillate. As long as the external current is permitted to flow into the input of tube 180, the circuit will continue oscillation but will stop when the current is removed. This circuit is very selective at audio frequencies, and the frequency of response of each detector unit 22 and 24 may be changed by adjusting the capacity of variable condensers 228, 230 and 232. Changing the capacity of these condensers will result in changing the characteristics of the network whereby said network will produce the necessary 180° phase shift for the particular frequency to which it is thus tuned.

It is to be noted that as aforesaid, both units are identical except that the values of their components are slightly changed so that each unit will be responsive to a different frequency. A change in frequency may be obtained by varying condensers 228, 230 and 232. The output of limiter section 102 will contain the various frequencies introduced into the circuit by microphone 66. Each frequency will serve to operate its own respective detector unit. The operation of either of the units will serve to energize their respective relay sections 250 and 252. Jacks 168 and 172 are connected to positive lead 86 and jacks 158 and 160 are connected to negative lead 70. The filament taps XX of transformer 38 are connected to the two sets of jacks 170, 171 and 166, 164 respectively.

The output of unit 24 is connected by means of terminal 162 to input condenser 248 of tube 250. A portion of the output of said unit also appears across resistor 252, which is connected to negative lead 70. Grid 254 of tube 250 has connected thereto a biasing resistor 256 which is connected to return lead 258. Return lead 258 is connected to one terminal of the primary of transformer 38.

Plate voltage for tube 250 is obtained through lead 260, which is connected to the other primary terminal of transformer 38. Thus, inspection of the circuit reveals that leads 260 and 258 are supplied with the same AC current that is used to supply transformer 38.

Plate 262 is connected through potentiometer 264 to lead 260. Condenser 266 shunts resistor 264 and serves to store up energy and thereby smooth out the plate current. Arm 268 couples energy to tube 272 and enables the application of a variable biasing voltage to grid 270 of tube 272 as operating conditions may necessitate. Cathode 274 of tube 250 is connected to return lead 258.

Suppressor 276 of shield 278 of tube 272 is connected to return lead 258. Plate 280 is connected through relay 282 to return lead 258, which serves to supply the plate voltage for tube 272. Relay 282 is shunted by condenser 284 which serves to suppress relay chatter. Cathode 286 is connected to lead 260.

The output of detector 22 is connected through plug 158 to load resistor 287 which is terminated to negative lead 70. A portion of the output of the detector unit 22 is coupled through condenser 288 into the grid 290 of amplifier tube 292. The grid 290 has a conventional biasing resistor 294 which is connected to return lead 260.

Cathode 296 is connected to return lead 258. Plate 298 is connected through potentiometer 300 to lead 260. Potentiometer 300 is shunted by condenser 302.

Arm 304 is connected with grid 306 of relay tube 308 whereby grid 306 is supplied with a predetermined biasing voltage and a signal input current wherein a signal is present. Suppressor 310, shield 312, and cathode 314 are connected to return lead 258. Plate 316 is connected through relay 318 to return lead 258. Relay 318 is shunted by condenser 320, which prevents relay chatter.

The control contacts of relays 282 and 318 are wired together in such manner that when said relays are pulled in, due to the action of the detector on the relay portion of the circuit, that each relay 318 and 282 will cause a separate light on the panel of the instrument to burn. Further, when both detector sections are caused to operate at the same time, and relays 282 and 318 are both responsive thereto, the master light 54 will become illuminated.

This relay circuit is arranged in the following manner: The current source for the illumination of the bulbs is taken from the line voltage and leads 258 and 322 serve to make connection therewith. Line 322 is connected to terminal 326 of relay 282. When the relay is closed, terminal 324 will be connected with line 330. Line 322 is also connected to terminal 328, which, when the relay is closed, is connected to contact 334. Contact 334 is connected through bulb 34 to return lead 258. Thus, when relay 282 is closed, bulb 34 will burn.

Line 330 is also connected to contact 336. Contact 336, when the relay is closed, forms a connection with contact 338, which is connected to master light 54. This connection serves to complete the circuit to return lead 258; thus, when both relays are down, master bulb 54 will be illuminated.

Lead 322 is connected to contact 340 and this contact will be connected with contact 342 when the relay is depressed. Contact 342 is connected to return 258 through lamp 36—thus, it can be seen that when relay 318 is depressed, lamp 36 will be illuminated. To absorb the sparking at the relay contacts 328, 334, 340 and 342, condensers 344 and 346 are placed across these sets of contacts respectively.

Positive lead 86 and negative lead 70 are connected to the output of power supply 348. Power supply 348 is connected to a power source through a double pole single-throw switch 350. Switch 350 is connected through fuse 352 and chokes 354—356. Power transformer 38 has thereon three secondary windings: the filament winding XX is connected with the various tubes as aforesaid; the outside terminals of the high voltage secondary 358 are connected to plates 360 and 362 of rectifier 364; and the filament of rectifier 364 is connected to the outside terminals of filament winding 366 of transformer 38. The output of the rectifier is coupled through a conventional brute force filter 368. This is done by connecting the center tap 370 of filament winding 366 to the input condenser 372 and the choke 42. The other terminal of condenser 372 is connected to the center tap 359 of the high voltage winding 358; and this center tap 359 is in turn connected with negative lead 70 to which is connected the one terminal of condenser 374. Condenser 374 is also connected to the output of choke 42. A bleeder resistance 376 is connected across condenser 374. The output of the power supply is connected through resistance 378 to the plate 381 of voltage regulator tube 380. The cathode 382 of tube 380 is connected to plate 384 of voltage regulator tube 386. The cathode 388 of said tube is connected to negative lead 70—thus, it will be seen that tubes 384 and 386 are connected in series. These tubes are voltage regulator tubes of the gaseous conduction type and have the property of decreasing their resistance as an increased voltage is applied thereto, or of increasing their resistance as a decreased voltage is applied thereto. By this manner of operation they serve to stabilize the output of the power supply and the voltage will remain relatively constant across positive lead 86 and negative lead 70. Positive lead 86 is connected to the plate of voltage regulator tube 380 and is by-passed by filter condenser 390.

A variable resistor 394 is connected in series with primary 392 of transformer 38. This resistance may be varied to control the voltage output of the secondary windings of transformer 38. Due to the influence of the voltage regulator tubes, variation of resistance 394 will not affect the output of the B supply but variation of this resistance enables the operator to adjust the filament voltages to the proper point of operation. In order that the apparatus will operate stably, it is necessary that all of the voltages be held within relatively close tolerances.

Figure 5:
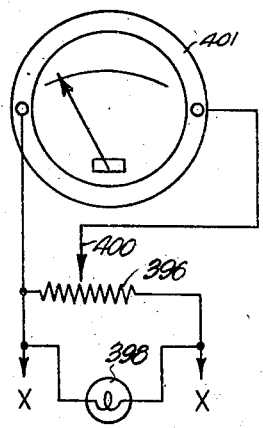

Fig. 5 shows a potentiometer 396 and a pilot light 398 connected across filament supply leads XX. This potentiometer has its variable arm 400 connected with one terminal of an A. C. voltmeter. The other terminal of the voltmeter 401 is connected to one of the remaining sides of the potentiometer 396. The voltmeter is then adjusted so that it will indicate a predetermined reading when variable resistance 394 is positioned whereby the proper filament voltage is applied to the tubes in the circuit.

It is to be noted with reference to circuit 12, that many of the portions thereof are conventional in character and therefore, the respective values of many of the components can be easily determined by those skilled in the art, hence, the values of the resistors and the condensers employed are not given since these values will vary, depending upon the type of tubes and associated equipment used. The operation of circuit 12 is as follows:

Sound vibrations upon striking crystal microphone 66 will cause an alternating voltage to appear upon the control grid 68 of tube 18. This variation will in turn produce a change in the plate current of tube 18. This change in plate current will produce a variation in voltage drop across plate resistors 90. This variation will be reflected in a changing voltage existing across plate condensers 96. The output of condenser 96 will alter the grid voltage on grid 106 of tube 20. This variation will cause a change in the plate current of section 100. This will reflect itself in a varying voltage drop across plate resistance 110. Condenser 112 will serve to couple a portion of the energy of the plate circuit of section 100 onto grid 120 of section 102. Thus, the gain developed across tube 18 and section 100 will result in the application of a considerably amplified potential to the grid of section 102. When high gain tubes are employed in the amplifier circuit as shown, a relatively small input into tube 18 will result in a very wide grid voltage swing with respect to section 102 of tube 20. This variation is so great that on the positive portion of the input cycle, the grid voltage of tube 102 will be such that said section 102 will have its plate current reach the saturation level.

It is important to notice that the components of the circuit are adjusted in a manner well-known to the art whereby when sound of a given amplitude strikes the microphone 66 that this saturation condition will occur in the plate circuit of section 102. It is manifest that when sounds of greater amplitude than that aforementioned strike microphone 66, that there cannot result a greater increase in the flow of current through section 102. Thus, it is seen that section 102 serves to act as a limiter, and that when its grid voltage reaches a certain value there will be no further change in the plate current of the tube.

To accomplish this manner of operation, it is generally desirable that section 102 be operated at zero bias but it is quite feasible by using various other tubes having different characteristics to alter the circuit components whereby to achieve the results as hereinbefore set forth. The practical effect of this manner of operation is that where various articles are being inspected, they may be projected with varying force against the anvil 60, without disturbing the normal operation of the detector.

A standard article having no metal separation cracks will ordinarily produce a signal of a certain definite amplitude and frequency. However, non-standard articles having metal separation cracks will produce a signal of smaller amplitude and a different frequency. Also, non-standard articles having no separation cracks will produce signals of an amplitude corresponding to that produced by the standard article but of a different frequency. The action of the limiter is to prevent a non-standard article from overloading the input portion of the detector and causing it to respond to a spurious signal, thus, if a non-standard article were projected with considerable force, the input level into the detector would be held at such value that the detector would be capable of discriminating between the spurious and standard signal.

In the case of an article having a separation crack therein, the amplitude of vibration is ordinarily such that the limiter will not be driven to saturation point, even when the article is projected with considerable force, and therefore, an input level will not be obtained which will be strong enough to operate the detectors. In the case of a standard article the gain through the amplifiers in the operation of the limiter is adjusted to a point whereby the projection of a standard article against the anvil with moderate force, or greater, will result in the production of a signal sufficiently strong to operate the detector units. Thus, it is seen that the use of the limiter section as explained, serves to establish a definite input voltage into the detector units and prevents overloading the same. This manner of operation also serves to eliminate to a great degree spurious responses which might be occasioned by shock voltages supplied to the microphone. The action of the limiter will be to prevent these shock voltages from overloading the detector and therefore, response to such a spurious signal will be prevented.

The output of the limiter section 102 is coupled by means of condensers 132, 136 and 138 into the detector units 22 and 24. Only a small portion of the output of limiter 122 is used to operate the said detector units and to achieve this objective, load resistor 134 having a very small resistance, is placed across the output of plate coupling condenser 132.

When a signal is placed upon the grid of tube 180, a certain amount of amplification will occur in this tube. The output of the plate circuit of tube 180 is coupled through condenser 196 onto grid 198 of tube 200. This tube serves to further amplify the signal and serves to isolate the plate circuit of tube 180 from other portions of the detector circuit. A signal input into tube 200 will result in the production of a varying voltage across potentiometer 212. The phase relation of the voltage across resistance 212 is such that if this voltage is shifted an additional 180° the same will be in phase with the voltage upon grid 178 of tube 180. In order to achieve an additional voltage shift of 180°, network 220 is employed. Network 220 is a tuned network and will produce a voltage shift of 180° only when a voltage having a frequency tuned to that of the network is supplied to the network. Potentiometer 212 is adjusted whereby the feed-back voltage under ordinary conditions supplied to grid 178 will be slightly less than that required to produce oscillation in the detector circuit. When a signal having a proper frequency is supplied to the detector circuit, re-generation will take place since the network will pass the current produced in the plate circuit of tube 200 by the predetermined frequency. Oscillation in this detector circuit will result in a substantially large output voltage being produced across condenser 242. The output of condenser 242 is coupled into the input of the relay sections 291 and 251.

It is, of course, understood that where separate detector units are employed as shown, the output of each unit is coupled into its respective amplifier. The output voltage of the detectors is stabilized by resistors 252 and 284. This stabilized voltage is coupled by means of condensers 248 and 288 into tubes 250 and 292 respectively. An increase in the voltage on the grids of these tubes will result in an increase plate current therethrough. This increase in plate current will lower the bias voltage on tubes 272 and 308 respectively.

This lowered bias voltage will permit a plate current to flow in these relay tubes during the portion of the alternating current cycle when their plates are positively charged. This increased current will cause relays 282 and 318 respectively, to be drawn down and operate the signal means as hereinbefore described.

Thus, if the requisite frequencies produced by standard articles are present in the output of the limiter section 102, detectors 22 and 24 will cause their respective relay sections 291 and 251 to operate. If only one frequency is present, only one relay section will be caused to operate and this operation will be indicated by means of a signal light as aforesaid. It is thus possible to determine by detecting certain frequencies, whether or not articles are correspondingly similar.

In some cases it has been found that much better discrimination is obtained when the harmonic or harmonics of the various signals produced by different articles are employed instead of the fundamental frequencies. It is, of course, easily possible to tune the detector units in such a manner that they will be operated by the harmonics produced by the article instead of the fundamental frequency. In many instances where this is done, improved performance will result.

There are a number of ways of using the instrument shown herein to accomplish the purposes of invention as heretofore stated. One method comprises setting a known standard article in free vibratory motion and measuring the frequency thereof, and then setting another article to be tested in vibratory motion and measuring its frequency. This may be accomplished by means of knobs 450 and indicating plates 452. Knobs 450 are attached to variable condensers 228, 230 and 232 of each unit and the dial plates serve as a means of calibrating the positions of the various knobs in terms of the frequency response of the detector units. Thus, in testing, the knobs are turned until maximum response of the detector is indicated by one of the lights 34 or 36, depending upon which detector unit is being used for the particular frequency being checked. The setting of the knob for this response is then noted and an article to be compared with the first or standard article is then dropped and the knobs set whereby the detector will give maximum response to to the second article. A comparison of the two settings serves to indicate the physical deviation between the two articles.

It is, of course, apparent that where articles are being tested having more than one frequency, that the frequency detectors may each be adjusted as aforesaid. When this is done, each frequency is compared with the respective frequency produced by the article being checked and in this way, the two articles may be compared. If all of the knobs or condensers 228, 230 and 232 are adjusted, a wider range of frequencies may be covered than if one knob is adjusted at the time. The needs of the user will, of course, determine the number of condensers that it is desirable to have adjustable in the manner as aforesaid.

Knobs 454 and 456 on the front panel of the instrument are used to vary potentiometers 264 and 300. These knobs are provided with dial plates 458 and 460 by which the sensitivity of the amplifier sections may be calibrated. By the adjustment of these knobs it is possible to set an amplifier section for response to a predetermined input voltage, thus the relative amplitude of variations of two pieces may be compared by noting the different positions of the knobs on the scale when the pieces are separately tested. The difference in setting indicates the difference in the amplitudes of vibration of the articles being tested. By adjusting both the variable condensers 228, 230 and 232 and potentiometers 264 and 300 at different times, it is possible to determine both the frequency and amplitude of variation of any particular piece.

In testing for amplitude of vibration, lights 34 and 36 are used to indicate peak response. This is possible since relays 30 and 32 pull in at certain definite values and the output of the various components of the testing unit may be adjusted so that these relays will be actuated when the unit is set to respond to a predetermined frequency and amplitude.

Where an article has more than one frequency of vibration, the amplitude of the several frequencies may be determined by adjusting both knobs 458 and 460.

Where a great many of the same kind of article is being tested, the most desirable manner of operation is to tune the instrument for response to a fixed frequency band or bands of frequencies having a fixed amplitude or amplitudes. Thus, when a standard article is tested the instrument is adjusted to a predetermined band width for the particular article, and the lights, in flashing, will indicate that the detector and relay units have been set in operation by a signal of a predetermined frequency and amplitude. Where a non-standard article is employed, the unit will not respond thereto and as a consequence, the lights on the panel will not be illuminated. If response is had to only one frequency produced by an article being tested, only one light will be illuminated, indicating that the article being tested conforms to the standard article in one particular, but in the other particular is different therefrom. As heretofore explained, the circuit is arranged so that master light 54 will also be illuminated when the instrument is responding to all test frequencies. The band width may be narrowed by increasing the size of condensers 228, 230 and 232 with respect to resistors 222, 224 and 226 respectively, or by increasing the size of the resistors with respect to the condensers the band width may be broadened.

The articles being tested may be dropped in such manner that all the frequencies are simultaneously produced, and if this is done, the instrument will indicate a total response. In some cases, however, it is desirable to produce first one frequency and then another frequency subsequent thereto. When this is done, a time delay circuit, which comprises condenser 248 and resistor 256 in relay section 291, and condenser 288 and resistor 294 in relay section 251, will serve to keep the first indicator light burning long enough for a test to be made to determine response to a second frequency. Thus, if all frequencies are present, the indicator lights will stay on long enough so that all of the lights will be illuminated at a single time.

Figure 7:
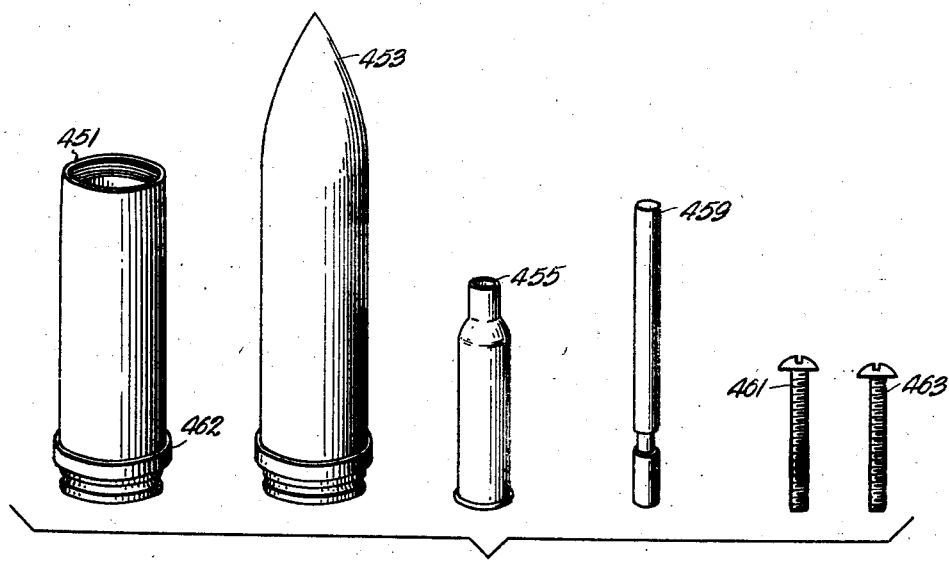
Fig. 7 is a perspective view of a number of types of articles with which the method and apparatus are used.

Fig. 7 shows a number of articles, the first being a 20 mm. high explosive projectile. In testing this article, the projectile 451 is dropped first upon its lower end and subsequently upon its side near the upper end thereof. It is desirable to drop the projectile in this manner since it avoids damage to the copper band 462. Shell case 455 is also excited in this manner. Various shapes of the different articles being tested will of necessity, determine the manner of excitation.

Fig. 10 shows a microphone which is comprised of a crystal element 402 which is supported within a cloth, mesh sack 404. The crystal is disposed a small distance from the rear of microphone 17. The microphone is connected by means of pins 406, 408 to points 410 and 412. It is very desirable that the crystal type of microphone shown be employed since the crystal is designed to be resonant to the particular frequencies to be detected.

With reference to Fig. 8, a means is shown of projecting articles to be tested with uniform force against the anvil 60. This means comprises a stand 414 that has attached thereto, a hopper mechanism 416. This hopper mechanism is comprised of a funnel-shaped container 418 within which the articles 420 are placed. A chute 422 forms the lower part of the hopper mechanism and is provided at its upper end with a round enclosure 424. This round enclosure has positioned therein a selector 426. This selector 426 is provided with slots 428 which will each accommodate one of the articles to be tested.

Selector 426 is rotated by means of knob 430 and the operation thereof will cause articles 420 to be dropped one at a time into chute 422. Chute 422 is provided with an angular side 432 which serves to direct the articles being tested downwardly. When these articles are projected from mouth 434, they fall in a vertical direction and with a uniform speed toward anvil 60.

Figure 6:
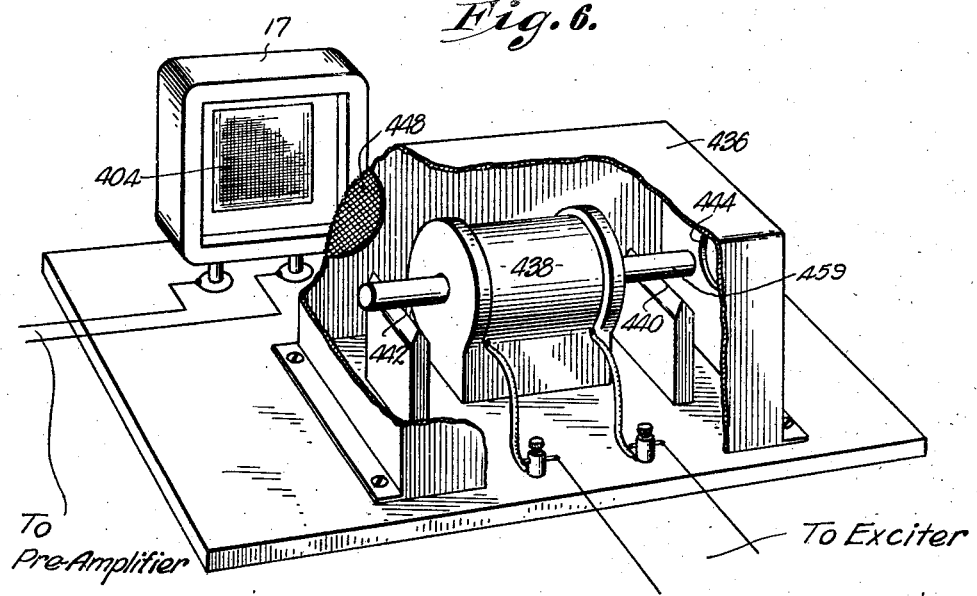
Fig. 6 is a perspective view of the apparatus for simulating, by electrical means, free vibration; a portion of the shield housing being broken away to disclose the coil and associated elements.

With reference to Fig. 6, a mechanism is shown which comprises a shield 436 which encloses therein a coil 438. This coil is mounted between knife edges 440 and 442. An article to be tested is inserted in the coil through opening 444 in the housing 436. The article is positioned so that it is supported by the knife edges 442 and 440 at its nodal points of vibration. These nodal points may be determined pragmatically by experimentally moving the knife edges until the best response is obtained. However, a stroboscope may be used to ascertain the nodal points of a particular article being tested and the article being tested positioned accordingly.

At one end of shield 436 is a perforated opening 448. When a current having a frequency corresponding to the natural frequency of the article being tested is impressed on coil 438, the article being tested will vibrate. These vibrations are in turn picked up by microphone 17 which is connected to the preamplifier. Shield 436 serves to prevent currents from being induced into the microphone circuit.

Fig. 7 shows a number of different articles which may be successfully selected by the apparatus shown. Article 451 is a representation of a 20 mm. high explosive projectile. This projectile is hollow having varying wall thicknesses and is surrounded at the bottom with a copper band 462. This particular article has two very distinct frequencies which may be caused to originate either simultaneously or separately, depending upon the manner in which the projectile is dropped upon the anvil. The degree of seating of the band also influences the vibratory frequencies of this projectile, and hence, the physical characteristics of the entire composite unit may be tested in a single operation by the apparatus shown.

Object 453 is a 20 mm. armor piercing projectile which has one predominate frequency and a number of harmonics. Since it too is a composite, the relationship of the elements and the physical characteristics of the whole may be tested in the manner as aforesaid.

Article 455 is a representation of a 30 caliber cartridge case. This case is a composite, being made up of several different elements. Measurement has shown that this particular case has a larger number of variable frequencies and each of them may be utilized to indicate the existence of a defect in a particular portion of the cartridge case. It has been found by examination that parts of the case vibrate at specific frequencies and hence, the variation of a particular frequency will indicate a physical variance of the particular part of the cartridge case with which it is associated.

Article 459 is a perishable tool and has primarily one basic frequency and a number of harmonics.

Articles 461 and 463 are bolts having slightly different physical characteristics. Bolt 463 is slightly shorter and the apparatus disclosed herein may be used to sort bolts of slightly different size since the size will alter the vibration characteristics of the bolts.

Having thus described the invention, what is claimed as new and desired to be secured by Letters Patent is:

1. The method of selecting standard articles from a group which comprises projecting a standard piece against an anvil to produce free vibration in the piece, measuring the natural and one overtone frequency of vibration produced therein, then projecting a piece to be tested against the anvil and measuring the natural and the same overtone frequency of vibration produced therein, and comparing the respective vibrations of the two pieces.

2. The method of selecting standard articles from a group which comprises projecting a standard piece against an anvil to produce free vibration in the piece, measuring the natural and one overtone frequency of vibration produced therein, then projecting a piece to be tested against the anvil and measuring the natural and the same overtone frequency of vibration produced therein, and simultaneously comparing the respective vibrations of the two pieces.

3. The method of selecting standard articles from a group which comprises projecting a standard piece against an anvil to produce free vibrations in the piece, measuring the frequency and amplitude of vibration of the natural and one overtone frequency of vibration within the piece, then projecting a piece to be tested with approximately equal force against the anvil to produce free vibrations therein, measuring the frequency and amplitude of the natural and the same overtone frequency of vibration of said piece being tested, and comparing the respective vibrations of the two pieces.

4. The method of selecting standard articles from a group which comprises projecting a standard piece against an anvil to produce free vibrations in the piece, simultaneously measuring the frequency and amplitude of vibration of the natural and one overtone frequency of vibration within the piece, then projecting a piece to be tested with approximately equal force against the anvil to produce free vibrations therein, measuring the frequency and amplitude of the natural and the same overtone frequency of vibration of said piece being tested, and comparing the respective vibrations of the two pieces.

5. The method of selecting standard articles from a group which comprises projecting a standard piece against an anvil to produce free vibrations in the piece, simultaneously measuring the frequency and amplitude of vibration of the natural and one overtone frequency of vibration within the piece, then projecting a piece to be tested with approximately equal force against the anvil to produce free vibrations therein, simultaneously measuring the frequency and amplitude of the natural and the same overtone frequency of vibration of said piece being tested and comparing the respective vibrations of the two pieces.

BOLEY A. ANDALIKIEWICZ.